United States Patent
Brossier et al.

(10) Patent No.: US 8,647,713 B2
(45) Date of Patent: Feb. 11, 2014

(54) METHOD FOR FORMING A PROTECTIVE COATING CONTAINING ALUMINUM ON THE SURFACE OF A METAL PART

(75) Inventors: Jerome Brossier, Evry-Cergy sur Yerres (FR); Justine Menuey, Annecy (FR); Annie Pasquet, Longjumeau (FR); Serge Naveos, Chatenay-Malabry (FR); Marie Pierre Bacos, Antony (FR); Pierre Josso, Erquy (FR)

(73) Assignees: SNECMA, Paris (FR); Onera, Chatillon (FR)

( * ) Notice: Subject to any disclaimer, the term of this patent is extended or adjusted under 35 U.S.C. 154(b) by 0 days.

(21) Appl. No.: 13/496,804

(22) PCT Filed: Sep. 20, 2010

(86) PCT No.: PCT/EP2010/063827
§ 371 (c)(1),
(2), (4) Date: Mar. 16, 2012

(87) PCT Pub. No.: WO2011/033116
PCT Pub. Date: Mar. 24, 2011

(65) Prior Publication Data
US 2012/0177823 A1    Jul. 12, 2012

(30) Foreign Application Priority Data
Sep. 18, 2009   (FR) ..................... 09 56446

(51) Int. Cl.
*B05D 3/02*    (2006.01)
(52) U.S. Cl.
USPC .......................................... 427/229; 427/226

(58) Field of Classification Search
USPC .................................................. 427/229, 226
See application file for complete search history.

(56) References Cited

U.S. PATENT DOCUMENTS 3,900,613 A * 8/1975 Galmiche et al. ............. 427/237
(Continued)

FOREIGN PATENT DOCUMENTS

EP          1 199 377       4/2002
WO       2009 112581        9/2009

OTHER PUBLICATIONS

U.S. Appl. No. 13/473,200, filed May 16, 2012, Carlin, et al.
International Search Report issued Oct. 25, 2010 in PCT/EP10/63827 filed Sep. 20, 2010.

*Primary Examiner* — Robert Vetere
(74) *Attorney, Agent, or Firm* — Oblon, Spivak, McClelland, Maier & Neustadt, L.L.P.

(57) ABSTRACT

A method for forming a protective coating containing aluminum on the surface of a metal part, wherein the part is contacted with a carburizer made of an aluminum alloy, at a treatment temperature and in a chamber, the atmosphere of which contains an active gas which reacts with the carburizer to form a gaseous aluminum halide, which decomposes upon contacting the part while depositing aluminum metal thereon. In the method the aluminum alloy of the carburizer includes at least one element, zirconium and/or hafnium, the active gas reacting with the carburizer to also form a halide of the reactive element which decomposes upon contacting the part while depositing the element thereon at the same time as the aluminum.

16 Claims, 1 Drawing Sheet

(56) References Cited

U.S. PATENT DOCUMENTS

| | | | |
|---|---|---|---|
| 4,936,927 A * | 6/1990 | Grunke et al. | 148/549 |
| 6,533,875 B1 | 3/2003 | Pfaendtner et al. | |
| 6,585,864 B1 * | 7/2003 | Fisher et al. | 204/192.16 |
| 6,863,925 B1 | 3/2005 | Wheat et al. | |
| 8,137,749 B2 | 3/2012 | Carlin et al. | |
| 8,202,574 B2 | 6/2012 | Carlin et al. | |
| 2004/0194858 A1 * | 10/2004 | Bacos et al. | 148/240 |
| 2011/0014370 A1 | 1/2011 | Brossier et al. | |

\* cited by examiner

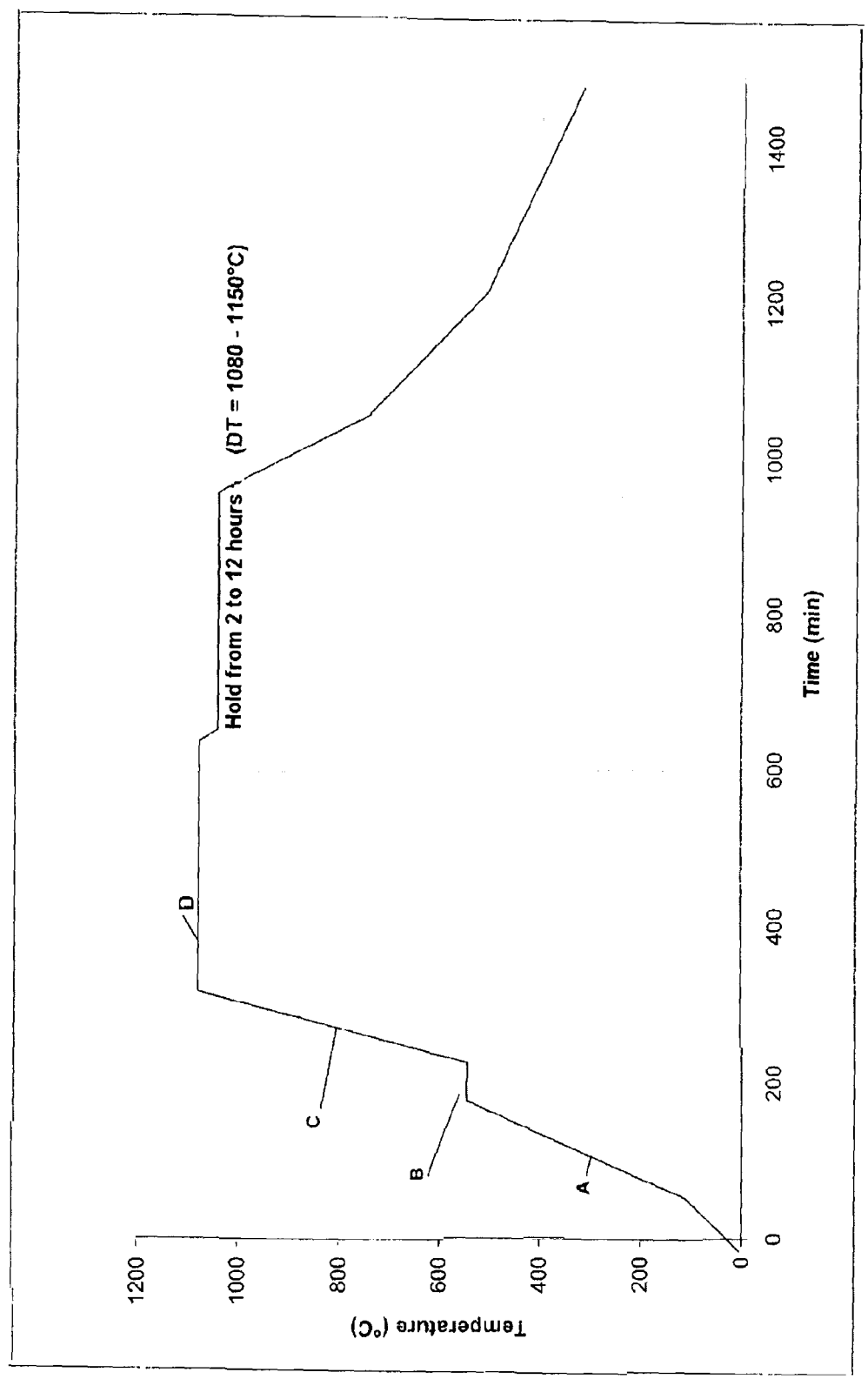

METHOD FOR FORMING A PROTECTIVE COATING CONTAINING ALUMINUM ON THE SURFACE OF A METAL PART

The present invention relates to the deposition of a protective coating based on aluminum on a metal part. It relates more particularly to the application of such a coating to parts of a turbomachine, notably a gas turbine engine.

A gas turbine engine, such as used for propulsion in the aeronautical field, comprises an atmospheric air intake that communicates with one or more compressors, generally including a fan, which are rotated about one and the same axis. The main stream of this air, after having been compressed, supplies a combustion chamber positioned annularly around this axis and is mixed with a fuel to provide hot gases, downstream, to one or more turbines through which these hot gases are expanded, the turbine rotors driving the compression rotors. The engines operate at a temperature of the engine gases at the turbine inlet which is sought to be as high as possible since performance is linked to it. For this purpose, the materials are selected to withstand these operating conditions and the walls of the parts swept by the hot gases, such as the turbine nozzles or the rotating turbine blades, are provided with cooling means. Furthermore, due to their metallic composition, made of a superalloy based on nickel or on cobalt, it is also necessary to protect them against the erosion and corrosion caused by the constituents of the engine gases at these temperatures.

A known means for ensuring protection of these parts is to deposit an aluminum-based coating on the surfaces liable to be attacked by the gases. Aluminum is attached to the substrate by metal interdiffusion and forms a protective oxide layer on the surface. The thickness of the coating is of the order of a few tens of microns.

The present invention relates to the technique, known per se, of depositing aluminum in the vapor phase, also called aluminization by vapor phase deposition. According to the method, the parts to be treated are placed in a semi-sealed chamber in which the atmosphere consists of a mixture of an inert or reducing gas, for example argon or hydrogen, and an active gas comprising an aluminum halide. At the reaction temperature, between 900° C. and 1150° C., the halide decomposes at the surface of the part into gaseous halogen and into aluminum that diffuses into the metal.

The halide is produced by placing a cement in the chamber with the parts to be treated, which cement is a donor of metallic aluminum or a metal alloy of aluminum with one or more of the metal constituents, notably chromium, of the material forming the parts to be protected, in the presence of granules of a compound of a halogen, chlorine or fluorine, that form the activator. Inert gas is circulated over the activator at a temperature that enables the sublimation of the halogen which is entrained over the donor and with which it reacts to produce the metal halide, which at this temperature is in vapor form.

Since the activator should be gaseous at the temperature of the coating and should not produce contaminants, products such as ammonium chloride, ammonium fluoride or ammonium bifluoride are generally chosen. In the presence of hydrogen or under a neutral gas and at a high temperature, these molecules decompose into ammonia and halogen. The vaporization temperature depends on the nature of the chosen halogenated salt. For example, it is 340° C. for ammonium chloride. The activator is only used for conveying a halogenated acid completely safely into the reactor where deposition is to be carried out, that is to say the semi-sealed container. The cation linked to this halogen (here ammonium) is consequently of no value.

The halide then decomposes in contact with the metal substrate to be coated, enabling aluminum to be deposited. A cyclic process is established during aluminization for the deposition of aluminum that proceeds continuously until the aluminum activity on the surface of the substrate becomes equal to that imposed by the cement. Gaseous halogen is reformed.

The coating obtained possibly serves as an intermediate layer between the metal substrate and a protective thermal barrier for this substrate on which it has been applied. The coating makes it possible to improve the strength of the thermal barrier on the substrate and also the capacity of the latter to preserve characteristics in use in case of degradation of the thermal barrier.

Furthermore, the favorable effect is known of a rare-earth element such as zirconium on the adhesion of an oxide layer on a metal substrate, whether this layer is formed by exposure to air at a high temperature or by deposition of a thermal barrier.

The activator, previously an ammonium fluoride or chloride, has been replaced by an activator containing the rare-earth element. Studies have focused on zirconium as being an element that can be deposited by means of the use of a zirconium oxychloride.

In patent FR 2853329, a vapor phase aluminization method is described that is modified so as to enable aluminum and zirconium to be co-deposited. The ammonium halide of the conventional APVS method is at least partly replaced by a zirconium compound, the presence of which is desired to be seen in trace amounts in the deposit.

Among the zirconium salts capable of performing the role of an activator, mention made be made in a non-limiting manner, of zirconium chloride $ZrCl_4$, zirconium oxychloride $ZrOCl_2$ and ammonium fluorozirconate $(NH_4)_2ZrF_6$. All these salts are gaseous above 250° C. Zirconium oxychloride is the preferred activator.

The deposition principle remains identical to that of the APVS method. The cement based on aluminum or an alloy of aluminum and notably chromium is placed, in the form of grains with a diameter between 1 mm and a few cm, in a suitable semi-sealed container. The parts to be coated are arranged so as to be brought into contact with the gaseous aluminum halide formed. The ammonium halide activator is entirely or partly replaced by zirconium oxychloride. The chamber in which the container is placed is heated to the APVS treatment temperature. Above a certain temperature, the activator evaporates and forms a vapor rich in zirconium chloride.

The latter decomposes at the surface of the substrate made of a nickel superalloy to form zirconium in the metallic state on the one hand, and on the other hand a halogenated acid available to form an aluminum halide in the donor cement. Zirconium deposited at the surface of the substrate then diffuses into the beta-NiAl coating being formed to give an intermetallic compound enriched with between 500 and 1000 ppm (parts per million) of zirconium.

Thermochemical analyses suggest that the NiAl(Zr) deposition method is carried out in two steps, the deposition of zirconium that takes place at low temperature (400-600° C.) followed by the aluminization at high temperature (1100° C.). Only AlCl among all the aluminum chlorides is directly responsible for the transport and deposition of the aluminum. $ZrCl_4$ is the main gaseous species of zirconium chloride present, the other species such as $ZrCl_3$, $ZrCl_2$ or $ZrCl$ are also contained in the reactor but with very much lower vapor pressures. Up to 620° C. the vapor pressure of ZrCl$_4$ is greater than AlCl. Above 620° C., the order of the pressures is reversed. At the aluminization temperature of 1100° C., the vapor pressure of ZrCl$_4$ is not high enough to enable the deposition of zirconium metal.

The formation of ZrCl$_4$, owing to ZrOCl$_2$.8H$_2$O is spontaneous, irrespective of the atmosphere and takes place from 350° C. onwards:

$$ZrOCl_2 + H_2O \rightarrow Zr_2O_3Cl = +2HCl$$

$$Zr_2O_3Cl_2 \rightarrow \tfrac{1}{2}ZrCl_4 + \tfrac{3}{2}ZrO_2$$

The first reaction releases HCl that reacts with the aluminum of the cement to form AlCl:

$$Al + HCl \rightarrow AlCl + \tfrac{1}{2}H_2$$

The reaction responsible for the deposition of zirconium at the surface of the alloy:

$$ZrCl_4 + 2AlC \rightarrow 2AlCl_3 + Zr$$

This reaction takes place at relatively low temperature when the vapor pressures of ZrCl$_4$ and AlCl are high. When 620° C. is exceeded, the vapor pressure of ZrCl$_4$ becomes too low and only aluminum is capable of being deposited at the surface of the substrate, according to the reaction:

$$3AlCl + 2Ni \rightarrow 2NiAl + AlCl_3$$

The NiAlZr deposit is then formed in a single step.

Besides zirconium, mention is also made of hafnium, which plays a similar role to that of zirconium.

The NiAlZr deposit thus formed has however several problems, notably in terms of homogeneity of the deposits in the chamber of the container: specifically, the element to be deposited, the zirconium, is incorporated into the activator. Therefore, there may be differences in the zirconium content as a function of the number of parts to be coated.

The invention targets an improved vapor phase deposition aluminization method of this type with co-deposition of zirconium, notably making it possible to control the Zr concentration in the deposit.

The method of the invention for forming a protective coating containing aluminum on the surface of a metal part, wherein said part is brought into contact with a cement made of aluminum alloy, at a treatment temperature, in a chamber with an atmosphere containing an active gas which reacts with the cement to form a gaseous aluminum halide, which decomposes in contact with the part depositing metallic aluminum thereon, is characterized in that the aluminum alloy of the cement comprises at least one reactive element, such as zirconium and/or hafnium, the active gas reacting with the cement to also form a halide of said reactive element, which decomposes in contact with the part depositing said reactive element thereon at the same time as the aluminum.

The advantage of this method is that, by providing the reactive element via the cement and not via the activator, the reproducibility of this method is improved.

The cement is a reservoir of aluminum and of the reactive element, zirconium and/or hafnium, which by gradually being attacked by the acid, releases the volatile metallic elements, while retaining a sufficient reserve of these reactive elements unlike the activator which becomes depleted.

More specifically, the active gas comprises a halogen or an ammonium halide: NH$_4$Cl, NH$_4$F and NH$_4$F.HF.

The atmosphere is formed, in addition to the active gas, of an inert or reducing gas such as argon or hydrogen, and the treatment temperature is between 950° C. and 1200° C. and preferably approximately 1080° C.

In accordance with one embodiment of the method, the part and the cement are together gradually heated with the gas in a chamber from room temperature up to the treatment temperature with a hold at 500° C.±100° C.

More particularly, the duration of the heating hold is 5 to 30 minutes. The heating is carried out gradually at a temperature rise rate of between 4° C. and 20° C. per minute.

The advantage of the method of the invention is that of controlling the amount of reactive element, such as zirconium, deposited. On the one hand, the hold permits good homogenization of the atmosphere in terms of reactive element with complete chemical reactions, and on the other hand the rapid temperature rise after decomposition enables aluminum and the reactive element to be deposited simultaneously.

The part contains at least nickel, which combines with aluminum to form, in the coating, an NiAl intermetallic compound in which the aluminum is partially substituted by the reactive element, zirconium and/or hafnium. More particularly, the part is made of a superalloy based on nickel.

Advantageously, the cement is formed from an alloy of aluminum, of chromium and of at least one of the two reactive elements, notably zirconium and hafnium.

More particularly, the ternary or quaternary cements are in the form of pebbles and are composed of 60-70% chromium, 20-30% aluminum, 3-15% zirconium and/or 3-15% hafnium, the total being 100%.

The method is particularly advantageous in the case where an aluminized sublayer of a thermal barrier is formed, such as that formed according to the technique presented in U.S. Pat. No. 5,514,482.

The zirconium in this sublayer makes it possible to stabilize the migration of the aluminum by acting as an aluminum diffusion moderator. Specifically, the aluminum has a tendency to migrate from the sublayer into the substrate, leading to the embrittlement of the sublayer due to the lack of material in the sublayer that results therefrom. Furthermore, the aluminum in the thermal barrier forms alumina which weakens the adhesion of the thermal barrier to the sublayer.

Other features and advantages will become apparent from the following description with reference to the sole FIGURE. This is a graph representing the change in temperature of a method according to the invention.

As was reported above, the method applies advantageously to the treatment of the rotating blades of a turbomachine or of a turbine in particular, or turbine nozzle vanes.

An aluminum donor cement, consisting of a chromium-aluminum alloy, is placed with the parts to be treated in a container, itself placed in a closed chamber so as to be able to operate in a controlled atmosphere.

In accordance with the invention, the cements are ternary or quaternary. They are in the form of pebbles and are composed, according to one exemplary embodiment, of 65% chromium, 30% aluminum and 5% zirconium or hafnium. For the quaternary cement, this is composed, for example, of 64% chromium, 30% aluminum, 3% zirconium and 3% hafnium. Since these cements are cast, the reactive elements (Zr, Hf) are homogeneously distributed.

Also placed is the activator, which is solid at ambient temperature, in a proportion relative to the cement of a few percent.

The chamber is then purged before introducing the gas constituting the initial atmosphere, argon or hydrogen.

The activator (NH$_4$F or NH$_4$Cl) decomposes forming hydrochloric acid or hydrofluoric acid, which will then attack the cement. This reaction releases volatile compounds containing elements such as aluminum, zirconium or hafnium.

Examples of probable reactions with the fluoride are given below:

| | $NH_4F \to NH_3F + HF$ | |
|---|---|---|
| Formation of the volatile compounds | $6HF + 2Al \to$ $2AlF_3 + 3H_2$ | $4HF + Zr \to$ $ZrF_4 + 2H2$ |
| | $AlF_3 + 2Al \to 3AlF$ | $ZrF_4 + 3Zr \to 4ZrF$ |
| Deposition on the substrate | $3AlF + 2Ni \to$ $2NiAl + AlF_3$ | $4ZrF + 3Ni \to$ $3NiZr + ZrF_4$ or $ZrF_4 + 2AlF \to Zr +$ $2AlF_3$ |

The NiAlZr, NiAlHf or NiAlZrHf deposits are then formed in a single step. The targeted amounts of reactive elements (Zr, Hf) are from 500 to 1000 ppm.

An advantageous treatment cycle comprises, as can be seen in the appended graph, a first heating step A. The temperature rise is gradual. The rate is between 4° C. and 20° C. per minute.

When the temperature reaches around 500° C., this temperature is kept constant, step B, for a duration of between 5 and 30 minutes so as to ensure the above targeted reactive element contents.

The temperature rise is resumed in step C. When the chamber has reached the aluminization treatment temperature, of between 1080° C. and 1180° C., this temperature is maintained, step D, for 4 to 16 hours so as to enable the deposition of the aluminum and its diffusion into the part. The reactive element, here zirconium, is concentrated in the first layer.

Tests were carried out in order to show the advantage of the solution. Three cements were prepared based on chromium with 30% aluminum and from 3% to 10% of reactive element, Zr, Hf and Zr—Hf, the balance to 100% by weight therefore being the chromium. The average lifetime DDV of test specimens produced by the method and coated with ceramic was measured, by carrying out high temperature heating cycles; the number of cycles determined was that when a spalling of 20% of the surface of the ceramic appeared. For the tests, the peak in ppm of the amount of reactant deposited on batch controls was measured, with the GDMS method.

The table below summarizes the tests and the measurements.

| Provision of reactive element via the cements | Average lifetime (DDV) | Test | Peak in ppm |
|---|---|---|---|
| CrAlZr | 720 cycles | 1 | Zr 200 |
| | | 2 | Zr 200 |
| | | 3 | Zr 250 |
| | | 4 | Zr 500 |
| CrAlHf | 750 cycles | 1 | Hf 600 |
| | | 2 | Hf 850 |
| | | 3 | Hf 450 |
| | | 4 | Hf 400 |
| CrAlZrHf | | 1 | Zr 350 Hf 450 |
| | | 2 | Zr 350 Hf 400 |
| | | 3 | Zr 100 Hf 200 |
| | | 4 | Zr 250 Hf 250 |

A low dispersion of the doping is observed, from 200 to 850 ppm by simple deposition, leading to an increase in the lifetime, relative to a prior art method, especially where the reactive elements are provided by the activator.

A very reduced dispersion of the doping is also observed, from 300 to 800 ppm by co-deposition, with an improvement of the lifetime.

What is claimed is:

1. A method for forming a protective coating on a surface of a metal part, the coating comprising aluminum and at least one of zirconium and hafnium;
   the method comprising:
   placing the part and a cement alloy comprising aluminum and at least one of zirconium and hafnium in a chamber;
   applying a treatment temperature to the chamber to form an atmosphere comprising an active gas which reacts with the cement to form a gaseous aluminum halide and a gaseous halide of the at least one of zirconium and hafnium;
   wherein the gaseous aluminum halide and the gaseous halide of the at least one of zirconium and hafnium decompose when in contact with the surface of the part depositing metallic aluminum and at least one of zirconium and hafnium thereon at the same time.

2. The method as claimed in claim 1, wherein the active gas comprises a halogen or an ammonium halide.

3. The method as claimed in claim 2, wherein the active gas comprises an ammonium halide and the ammonium halide is selected from the group consisting of $NH_4Cl$, $NH_4F$ and $NH_4F \cdot HF$.

4. The method as claimed in claim 1, wherein the atmosphere, in addition to the active gas, further comprises an inert or reducing gas.

5. The method as claimed in claim 4, wherein the the inert gas is argon and the reducing gas is hydrogen.

6. The method as claimed in claim 1, wherein the part and the cement are together gradually heated with the gas in a chamber from room temperature up to a hold temperature at 500° C.±100° C. and then heated to the treatment temperature.

7. The method as claimed in claim 6, wherein a duration of the heating hold is from 5 to 30 minutes.

8. The method as claimed in claim 6, wherein the gradual heating comprises a temperature rise rate of between 4° C. and 20° C. per minute.

9. The method as claimed in claim 1, wherein the part comprises nickel, which combines with aluminum to form, in the coating, a NiAl intermetallic compound comprising at least one of zirconium and hafnium.

10. The method as claimed in claim 1, wherein the part is made of a superalloy based on nickel or on cobalt.

11. The method as claimed in claim 1, wherein the cement is an alloy comprising aluminum, chromium, and at least one of zirconium and hafnium.

12. The method as claimed in claim 11, wherein the cement is in the form of pebbles and comprises 60-70% chromium, 20-30% aluminum, and at least one of 3-15% zirconium and 3-15% hafnium.

13. The method as claimed in claim 12, wherein the cement is cast.

14. The method as claimed in claim 1, wherein said treatment temperature is between 950° C. and 1200° C.

15. The method as claimed in claim 14, wherein said treatment temperature is approximately 1080° C.

16. A method for forming a protective aluminum coating on a metal part, the metal of the part comprising nickel and the aluminum coating comprising at least one of zirconium and hafnium;

the method comprising:

placing the metal part, a halide activator and a donor cement comprising aluminum and at least one of zirconium and hafnium in a vapor deposition chamber;

forming an atmosphere comprising at least one of an inert gas and a reducing gas in the chamber;

heating the chamber to a temperature of 400 to 600° C. and maintaining the temperature from 400 to 600° C. for a time of from 5 to 30 minutes;

then heating the chamber to an aluminization treatment temperature and maintaining the aluminization treatment temperature for a time to obtain a deposition coating of the protective aluminum coating on the metal part;

wherein the halide activator, upon heating forms an active gas which reacts with the donor cement to form a gaseous aluminum halide and at least one of a gaseous halide of the zirconium and hafnium, which gases decompose upon contact with the nickel metal part depositing the protective aluminum coating thereon.

* * * * *